(12) United States Patent
Wang et al.

(10) Patent No.: US 11,955,839 B2
(45) Date of Patent: Apr. 9, 2024

(54) DUAL-INPUT CIRCUIT

(71) Applicant: Anhui Dynamic Power CO., Ltd, Anhui (CN)

(72) Inventors: Chuntian Wang, Anhui (CN); Jianhua Zhu, Anhui (CN)

(73) Assignee: Anhui Dynamic Power CO., Ltd, Anhui (CN)

( * ) Notice: Subject to any disclaimer, the term of this patent is extended or adjusted under 35 U.S.C. 154(b) by 341 days.

(21) Appl. No.: 17/437,421

(22) PCT Filed: Jul. 14, 2021

(86) PCT No.: PCT/CN2021/106240
§ 371 (c)(1),
(2) Date: Sep. 9, 2021

(87) PCT Pub. No.: WO2022/042109
PCT Pub. Date: Mar. 3, 2022

(65) Prior Publication Data
US 2022/0238287 A1 Jul. 28, 2022

(30) Foreign Application Priority Data

Aug. 24, 2020 (CN) .......................... 202010856364.5

(51) Int. Cl.
*H02J 9/06* (2006.01)
*H01H 13/46* (2006.01)

(52) U.S. Cl.
CPC ............. *H02J 9/068* (2020.01); *H01H 13/46* (2013.01)

(58) Field of Classification Search
CPC ....................................................... H02J 9/068
USPC ............................................................ 307/64
See application file for complete search history.

(56) References Cited

U.S. PATENT DOCUMENTS

| 2004/0217653 A1* | 11/2004 | Neidorff | ................... | H02J 9/06 307/80 |
| 2011/0025129 A1* | 2/2011 | Humphrey | .............. | H02J 9/061 307/64 |
| 2011/0148204 A1* | 6/2011 | DiMarco | ................. | H02J 9/062 307/65 |

* cited by examiner

*Primary Examiner* — Joseph Chang
(74) *Attorney, Agent, or Firm* — JCIP GLOBAL INC.

(57) ABSTRACT

Disclosed is a dual-input circuit, adopting a contactor as a switching device, and being more suitable for medium and high-power applications. In addition, the adopted contactor is a single double-pole double-throw contactor with an interlocking function. In this way, the circuit is safe, simple, and easily controllable, and space utilization can be further improved. In addition, the adopted contactor further is of a magnetic attraction type, with lower power consumption for long-term work. In the present invention, either one of two inputs is set as a main input and the other is set to a backup input by default, so that the present invention can be more flexibly applied and is more applicable. To enable switching when both or only either one of the two inputs has an input voltage, the present invention further adopts a single dual-input auxiliary power supply to reduce a required space and further reduce costs.

8 Claims, 6 Drawing Sheets

DUAL-INPUT CIRCUIT

CROSS-REFERENCE TO RELATED APPLICATION

This application is a 371 of international application of PCT application serial no. PCT/CN2021/106240, filed on Jul. 14, 2021, which claims the priority benefit of China application no. 202010856364.5, filed on Aug. 24, 2020. The entirety of each of the above mentioned patent applications is hereby incorporated by reference herein and made a part of this specification.

BACKGROUND

Technical Field

The present invention relates to the field of power supply, and in particular, to a dual-input circuit.

Description of Related Art

Modern power supplies are becoming increasingly miniaturized, and in some occasions, requirements for stability of the power supplies are becoming higher. As a result, two power supplies with different inputs are used to achieve input redundancy. However, this method has high costs and occupies a large space. Therefore, a product that implements dual inputs through a single power supply has emerged. The existing dual-input circuits are mostly circuits that use a combination of a plurality of relays. Such a circuit structure is relatively complex and occupies a large space, with high costs, complex control, long minimum switching time, low reliability (with a large number of devices, the relays cannot be switched with HVDC power), and high control power consumption.

SUMMARY

In view of the problem existing in the background, the present invention provides a novel dual-input circuit, which, compared with the original circuit, can simplify a circuit structure and effectively improve space utilization, providing a solution for further miniaturization of power supplies.

A dual-input circuit includes a first input port, a second input port, an intelligent switching unit, an auxiliary power supply unit, and a key power supply unit.

The first input port receives a first input voltage, the second input port receives a second input voltage, and the auxiliary power supply unit is provided in parallel between the first input port and the second input port.

The intelligent switching unit is connected to the first input port, the second input port, and the auxiliary power supply unit, to provide the key power supply unit with and output one of the first input voltage and the second input voltage.

Further the first input port includes a first electromagnetic interference filter and a first detection circuit, the second input port includes a second electromagnetic interference filter and a second detection circuit, and the intelligent switching unit includes a contactor, a dual-input control circuit, a first contactor drive circuit, a second contactor drive circuit, a third electromagnetic interference filter, and a third detection circuit.

Further, the first electromagnetic interference filter and the second electromagnetic interference filter are respectively connected to the first input voltage and the second input voltage and respectively perform filtering.

Further, the first detection circuit detects whether the first input voltage works normally, and provides a first detection signal to the dual-input control circuit; the second detection circuit detects whether the second input voltage works normally, and provides a second detection signal to the dual-input control circuit; the third detection circuit detects whether the contactor outputs a voltage normally, and provides a third detection signal to the dual-input control circuit; and through determining based on the first detection signal, the second detection signal, and the third detection signal, the dual-input control circuit controls the contactor through the first contactor drive circuit and the second contactor drive circuit, to implement switching from one of the first input voltage and the second input voltage to the other or to remain in a current state.

Further, contacts A2 and C2 of the contactor are short-circuited, and contacts B2 and D2 are short-circuited, to form an output of the contactor, and the output of the contactor is connected to the key power circuit through the third electromagnetic interference filter.

Further, the auxiliary power supply unit adopts a flyback dual-input auxiliary power supply, and is respectively connected to the first input voltage and the second input voltage through the first electromagnetic interference filter and the second electromagnetic interference filter; when one or each of the first input voltage and the second input voltage has a normal input voltage, the dual-input auxiliary power supply provides auxiliary power to the dual-input control circuit, the first contactor drive circuit, the second contactor drive circuit, the first detection circuit, the second detection circuit, and the third detection circuit; and when one of the first input voltage and the second input voltage is connected to the key power circuit, a main auxiliary power supply in the key power circuit provides auxiliary power to the dual-input control circuit, the first detection circuit, the second detection circuit, and the third detection circuit, while the first contactor drive circuit and the second contactor drive circuit are still powered by the dual-input auxiliary power supply.

Further, one of two inputs of the dual-input circuit is set as a main input and the other is set as a backup input by default.

Further, when only the first input voltage has a normal voltage and the second input voltage has no normal voltage, the first input voltage is connected to an output of the contactor, and the second input voltage is isolated from the output of the contactor and the first input voltage due to disconnection of a group of contacts corresponding to the second input voltage; or when only the second input voltage has a normal voltage and the first input voltage has no normal voltage, the second input voltage is connected to an output of the contactor, and the first input voltage is isolated from the output of the contactor and the second input voltage due to disconnection of a group of contacts corresponding to the first input voltage; or when both the first input voltage and the second input voltage have normal voltages, a main input thereof is connected to an output of the contactor, and a backup input thereof is isolated from a circuit of the output of the contactor and a voltage of the main input due to disconnection of a group of contacts corresponding to the backup input; when the voltage of the main input deteriorates, the dual-input control circuit sends a control signal to drive the contactor to switch, to connect the backup input to the output of the contactor; and only one of the first input voltage and the second input voltage is connected to the key power circuit at any moment.

Further, the contactor switches an alternating current (AC) loop and is capable of switching a high-voltage direct current (DC) loop; and specifically, the contactor is capable of switching with load on the AC loop and is capable of switching with load on the high-voltage DC loop.

The present invention has the following beneficial effects: The present invention adopts a contactor as a switching device, which is more suitable for medium and high-power applications. In addition, the adopted contactor is a single double-pole double-throw contactor with an interlocking function. In this way, the circuit is safe, simple, and easily controllable, and space utilization can be further improved. In addition, the adopted contactor further is of a magnetic attraction type, with lower power consumption for long-term work. In the present invention, either one of two inputs is set as a main input and the other is set to a backup input by default, so that the present invention can be more flexibly applied and is more applicable. To enable switching when both or only either one of the two inputs has an input voltage, the present invention further adopts a single dual-input auxiliary power supply. Compared with a solution in which two single-input auxiliary power supplies are adopted, this solution can reduce a required space and further reduce costs.

DESCRIPTION OF THE EMBODIMENTS

The following describes in detail the technical solutions of the present invention with reference to the accompanying drawings of this specification.

Figure 1:
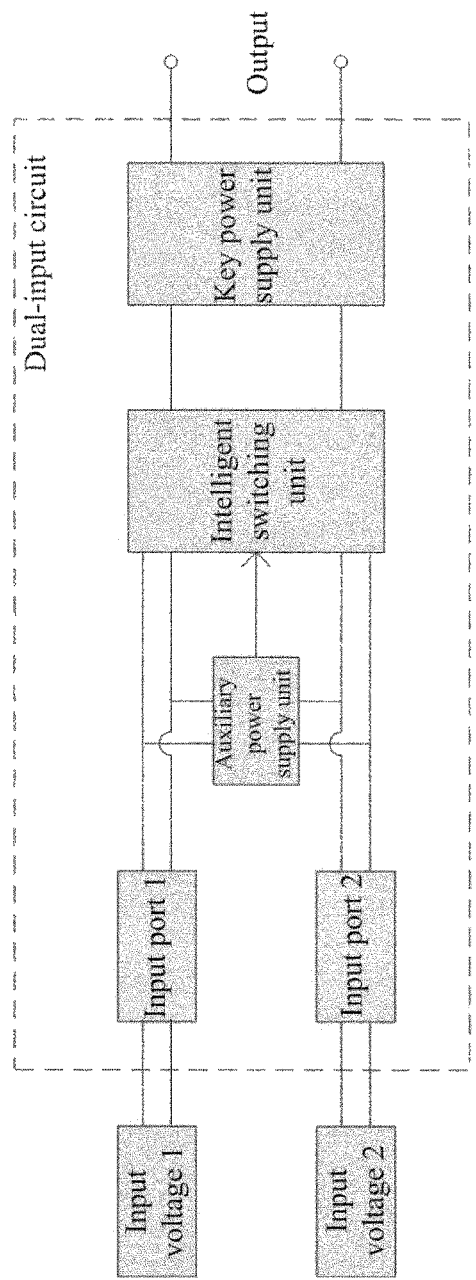
FIG. 1 is a schematic structural diagram of a dual-input circuit according to an embodiment of the present invention.

As shown in FIG. 1, a dual-input circuit of an embodiment of the present disclosure may include an input port 1, an input port 2, an intelligent switching unit, an auxiliary power supply unit, and a key power supply unit.

The input port 1 may be connected to an input voltage 1, and the input port 2 may be connected to an input voltage 2.

The intelligent switching unit may be connected to the input ports 1 and 2, to provide one of the input voltage 1 and the input voltage 2 to the key power supply unit.

The dual-input circuit of this embodiment of the present disclosure can achieve input redundancy in a single power supply with two different input voltages: an input voltage 1 and an input voltage 2. This can both meet some high requirements for power supply stability and reduce costs, and can further improve space utilization.

Figure 2:
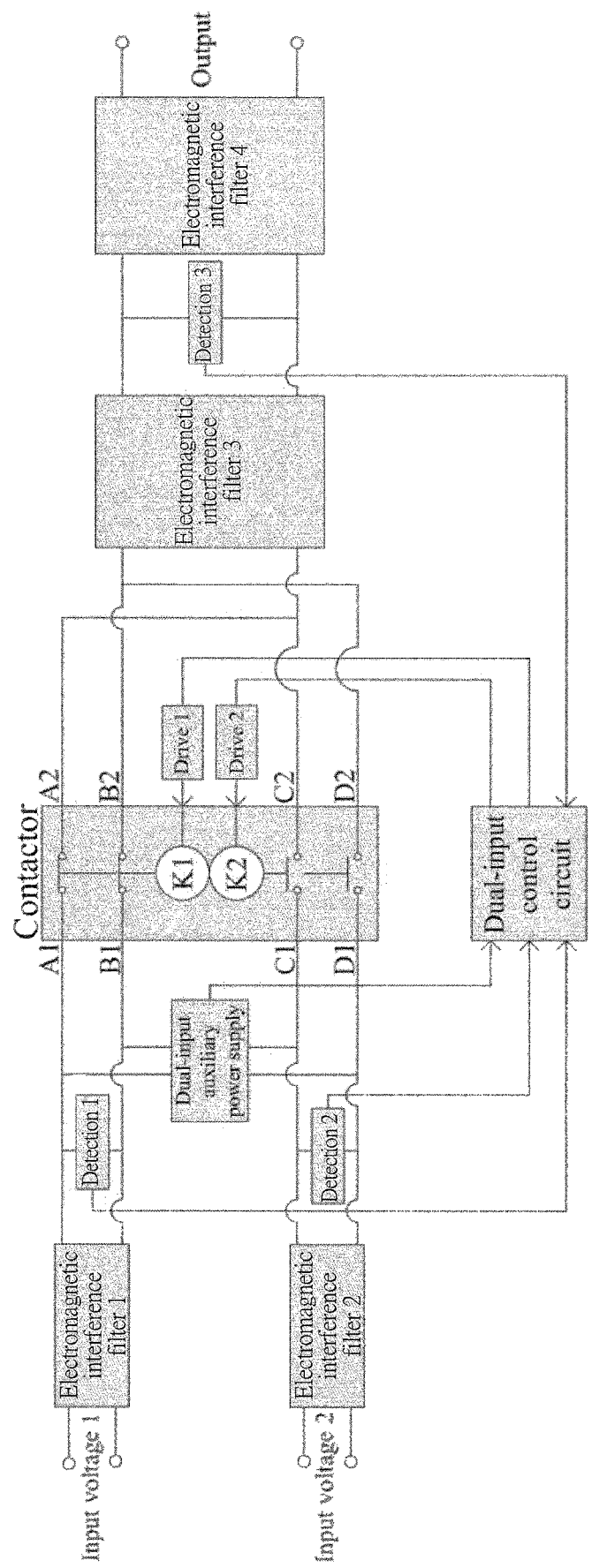
FIG. 2 is a state diagram of a contactor when a first input voltage has a normal voltage but a second input voltage has no normal voltage according to an embodiment of the present invention.

An embodiment of the present disclosure is further described with reference to FIG. 2. As shown in FIG. 2, a dual-input circuit may include a contactor, a dual-input auxiliary power supply, detection 1, detection 2, a dual-input control circuit, detection 3, an electromagnetic interference filter 1, an electromagnetic interference filter 2, an electromagnetic interference filter 3, and a key power circuit.

The electromagnetic interference filter 1 and the electromagnetic interference filter 2 are respectively connected to an input voltage 1 and an input voltage 2. The electromagnetic interference filter 1 and the electromagnetic interference filter 2 may respectively filter the input voltage 1 and the input voltage 2, to meet requirements of electromagnetic compatibility. The input voltage 1 and the input voltage 2 may alternatively be connected to a dual-input circuit of this embodiment of the present disclosure in other manners, and there is no special restriction on this.

The input voltage 1 is connected to contacts A1 and B1 of the contactor through the electromagnetic interference filter 1. The input voltage 2 is connected to contacts C1 and D1 of the contactor through the electromagnetic interference filter 2. The contacts A2 and C2 of the contactor are short-circuited, and the contacts B2 and D2 are short-circuited, to form an output of the contactor. The output of the contactor is connected to the key power circuit through the electromagnetic interference filter 3. The electromagnetic interference filter 3 filters an output line of the contactor. The electromagnetic interference filter 1, the electromagnetic interference filter 2, and the electromagnetic interference filter 3 are combined to filter an overall line, or other combinations can be used, and there is no special restriction on this.

As an auxiliary power supply circuit, the dual-input auxiliary power supply is connected to the input voltage 1 and the input voltage 2 through the electromagnetic interference filter 1 and the electromagnetic interference filter 2, respectively. When one or each of the input voltage 1 and the input voltage 2 has a normal input voltage, the dual-input auxiliary power supply can supply auxiliary power to the dual-input control circuit, a contactor drive circuit 1, a contactor drive circuit 2, a circuit of the detection 1, a circuit of the detection 2, and a circuit of the detection 3. When one of the input voltage 1 and the input voltage 2 is connected to the key power circuit, a main auxiliary power supply in the key power circuit provides auxiliary power supply to the dual-input control circuit, the detection circuit 1, the detection circuit 2, and the detection circuit 3, while the contactor drive 1 circuit and the contactor drive 2 circuit are still powered by the dual-input auxiliary power supply.

The circuit of the detection 1 may detect whether the input voltage 1 works normally, and provide a detection signal 1 to the control circuit. The circuit of the detection 2 may detect whether the input voltage 2 works normally, and provide a detection signal 2 to the control circuit. The circuit of the detection 3 may detect whether the contactor outputs a voltage normally, and provide a detection signal 3 to the control circuit. Through determining based on the detection signal 1, the detection signal 2, and the detection signal 3, the control circuit controls the contactor, to implement switching from one of the input voltage 1 and the input voltage 2 to the other or to remain in a current state.

Either of two inputs can be flexibly set as a main input and the other is set as a backup input by default. When the input voltage 1 is set as a main input by default, the input voltage 2 is a backup input. When the input voltage 2 is set as a main input by default, the input voltage 1 is a backup input.

Figure 3:
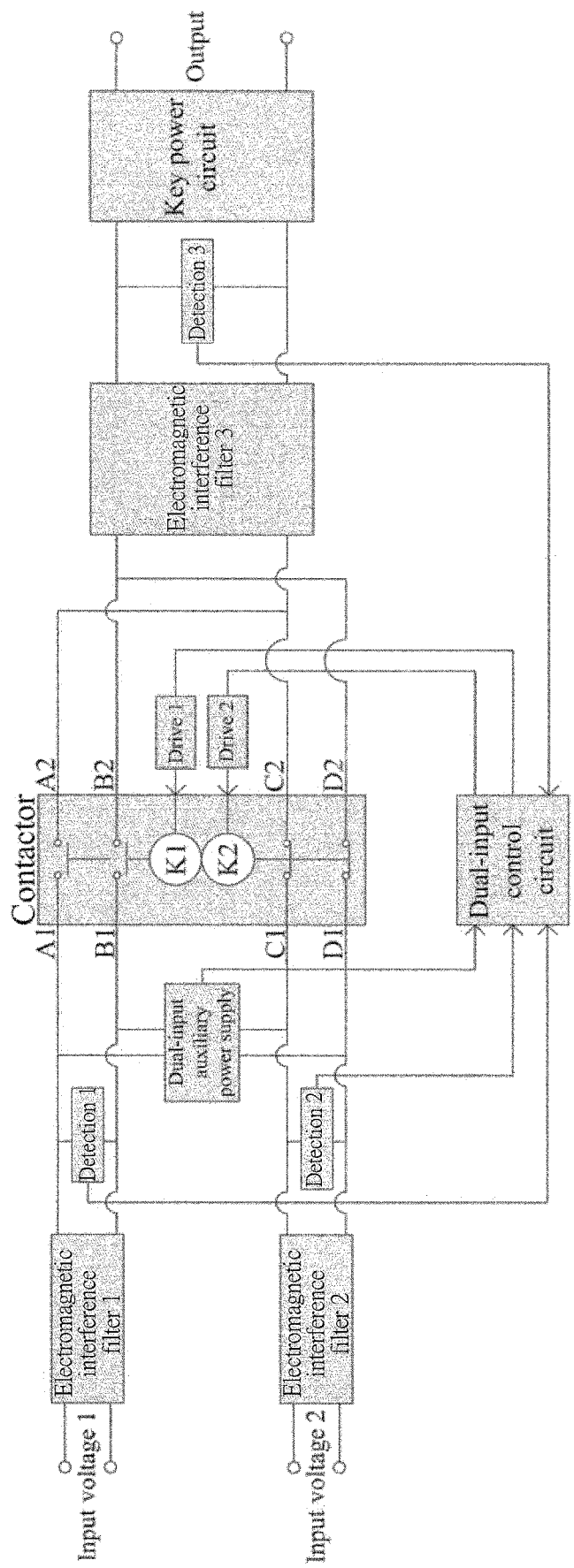
FIG. 3 is a state diagram of a contactor when a second input voltage has a normal voltage but a first input voltage has no normal voltage according to an embodiment of the present invention.

When only the input voltage 1 has a normal voltage and the input voltage 2 has no normal voltage, the input voltage 1 is connected to an output of the contactor, and the input voltage 2 is isolated from the output of the contactor and the input voltage 1 due to disconnection of a group of contacts corresponding to the input voltage 2. For a state of the contactor, refer to FIG. 2. When only the input voltage 2 has a normal voltage and the input voltage 1 has no normal voltage, the input voltage 2 is connected to an output of the contactor, and the input voltage 1 is isolated from the output of the contactor and the input voltage 2 due to disconnection of a group of contacts corresponding to the input voltage 1. For a state of the contactor, refer to FIG. 3. When both the input voltage 1 and the input voltage 2 have normal voltages, a main input thereof is connected to an output of the contactor, and a backup input thereof is isolated from a circuit of the output of the contactor and a voltage of the main input due to disconnection of a group of contacts corresponding to the backup input. When the voltage of the main input deteriorates (dropout or over-undervoltage), the dual-input control circuit sends a control signal to drive the contactor to switch, to connect the backup input to the output of the contactor. Only one of the input voltage 1 and the input voltage 2 is connected to the key power circuit at any moment.

The two inputs may be two AC input voltages, or may be one AC input voltage and one DC input voltage, or may be two DC input voltages.

Compared with a relay, this embodiment uses a contactor as a switching device, and the contactor can be used to turn on or turn off a loop with relatively high power. The contactor used in this embodiment can switch both an AC loop and a high-voltage DC loop. Further, the contactor used in this embodiment can switch with load on the AC loop and can switch with load on the high-voltage DC loop.

The contactor in this embodiment is a single double-pole double-throw contactor, and is controlled by double coils, including four contacts "A1-A2", "B1-B2", "C1-C2", and "D1-D2" and two coils K1 and K2. When the coil K1 is positively excited and the coil K2 is not excited, the two contacts "A1-A2" and "B1-B2" are closed, and the two contacts "C1-C2" and "D1-D2" are open. After the coil is de-excited, states of the contacts of the contactor are maintained by permanent magnet steel inside the contactor. When the coil K2 is positively excited and the coil K1 is not excited, the two contacts "C1-C2" and "D1-D2" are closed, and the two contacts "A1-A2" and "B1-B2" are open. After the coil is de-excited, states of the contacts of the contactor are maintained by permanent magnet steel inside the contactor. The excitation of the coil K1 and the coil K2 cannot be active at the same time, and control signals of the two coils are interlocked so that they are not active at the same time. "A1-A2" and "C1-C2" are mechanically related. When the contact "A1-A2" is closed, the contact "C1-C2" is also closed. When the contact "A1-A2" is open, the contact "C1-C2" is also open. Similarly, "B1-B2" and "D1-D2" are mechanically related. When the contact "B1-B2" is closed, the contact "D1-D2" is also closed. When the contact "B1-B2" is open, the contact "D1-D2" is also open. "A1-A2" and "B1-B2" are defined as a first group of contacts, and "C1-C2" and "D1-D2" are defined as a second group of contacts. The first group of contacts and the second group of contacts are mechanically interlocked. That is, when the two contacts "A1-A2" and "B1-B2" are closed, the two contacts "C1-C2" and "D1-D2" are open, and when the two contacts "A1-A2" and "B1-B2" are open, the two contacts "C1-C2" and "D1-D2" are closed. Further, before the two contacts "A1-A2" and "B1-B2" are closed, the two contacts "C1-C2" and "D1-D2" have been open. Before the two contacts "C1-C2" and "D1-D2" are closed, the two contacts "A1-A2" and "B1-B2" have been open. The mechanical interlocking between the first group of contacts and the second group of contacts can prevent the two inputs from being short-circuited by mistake, thereby ensuring safety between the two inputs. In addition, the circuit structure is simpler and the control is easier.

Further, the contactor used in this embodiment may be controlled by a single coil in addition to double coils. The foregoing contactor is still used as an example. If only the coil K1 is controlled and the coil K2 is not controlled or is removed, it can be considered as single coil control. In this way, a control effect of applying positive excitation to the coil K1 in the single-coil control is equivalent to a control effect of applying positive excitation to the coil K1 and applying no excitation to the coil K2 in double-coil control. A control effect of applying negative excitation to the coil K1 in the single coil control is equivalent to a control effect of applying positive excitation to the coil K2 and applying no excitation to the coil K1 in the double-coil control. The contactor in the present invention is not limited to a single double-pole double-throw contactor. The single double-pole double-throw contactor used in this embodiment has an interlocking function, and is safe, simple in circuit, and easy to control.

The contactor in this embodiment may be of a magnetic attraction type, or may be of an electromagnetic attraction type. In a preferred embodiment, the contactor of this embodiment is of the magnetic attraction type, the coil is excited by pulse, and each excitation time is 200 ms≤t≤500 ms. After the coil is de-excited, states of the contacts of the contactor are maintained by permanent magnetic steel inside the contactor. That the contactor is of the magnetic attraction type has the following advantages over the electromagnetic attraction type: First, a permanent magnet operating mechanism greatly reduces power consumption of maintaining the coils, which is environmentally friendly and energy-saving. (The coils of the contactor of the magnetic attraction type do not need to be excited for a long time, and the coils of the contactor no longer consume power when the contactor does not need to be switched during long-term operation of the circuit. Therefore, system power loss can be reduced.) Second, compared with electromagnetic attraction, magnetic attraction has low noise and no contamination. Third, the permanent magnet operating mechanism removes a series of complex and cumbersome lock protection devices from the electromagnetic mechanism, thereby greatly improving working reliability of the contactor operating mechanism, reducing production processes and costs, and reducing a volume of the contactor. Herein, that the excitation time is 200 ms≤t≤500 ms is merely an example, and this is not specially limited in the present disclosure.

The contactor adopted in this embodiment is of a PCB welding type. The product has advantages of small size, light weight, low coil drive power, and small action vibration, and is particularly suitable for use of an integrated PCB main loop.

The contactor adopted in this embodiment has a height of no more than 32 mm, so that the solution can be applied to a case in which a height of a whole machine is required not to exceed 42 mm.

Figure 4:
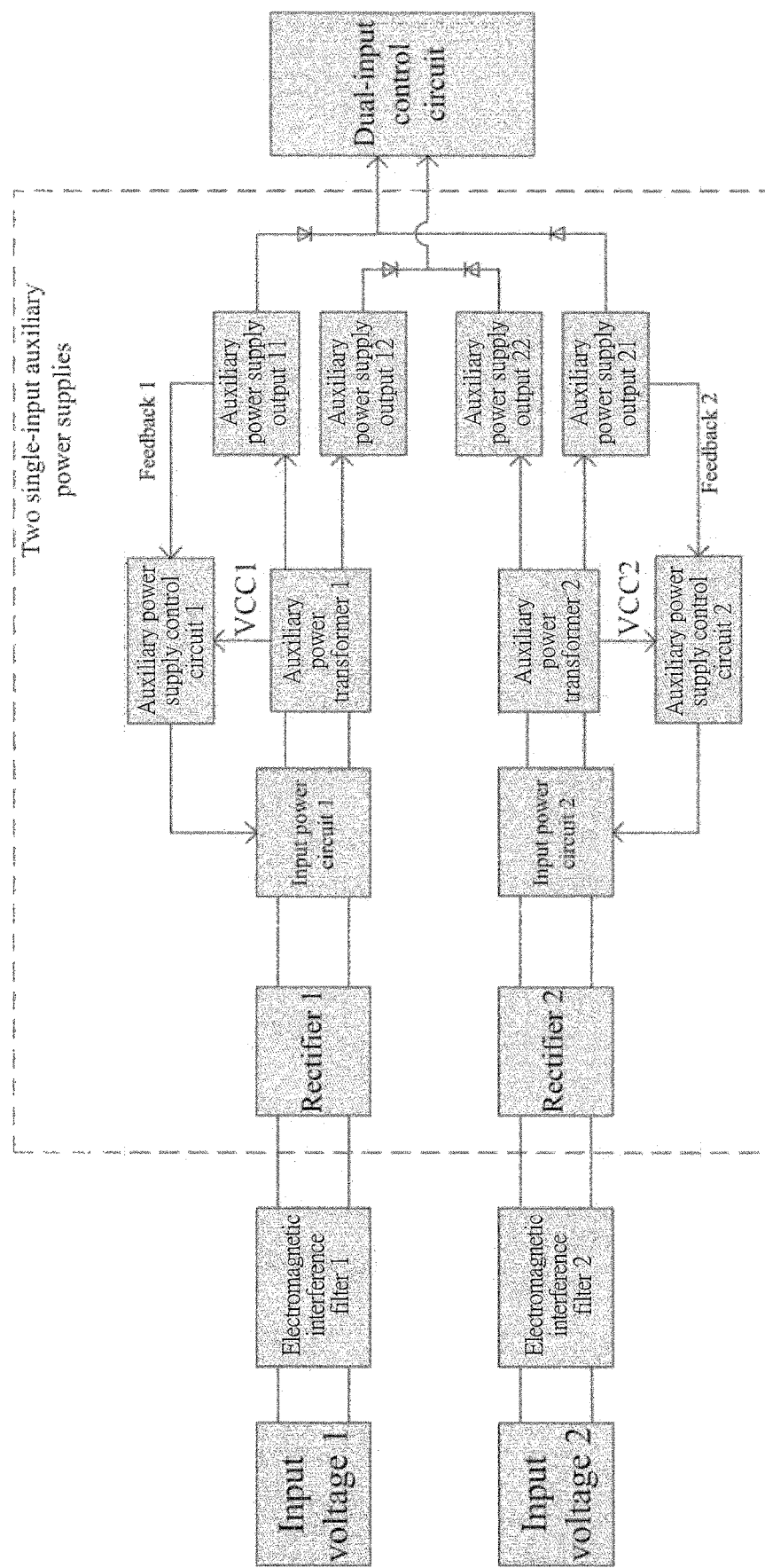
FIG. 4 is a structural diagram of a dual-voltage input circuit when a conventional solution is used according to an embodiment of the present invention.
Figure 5:
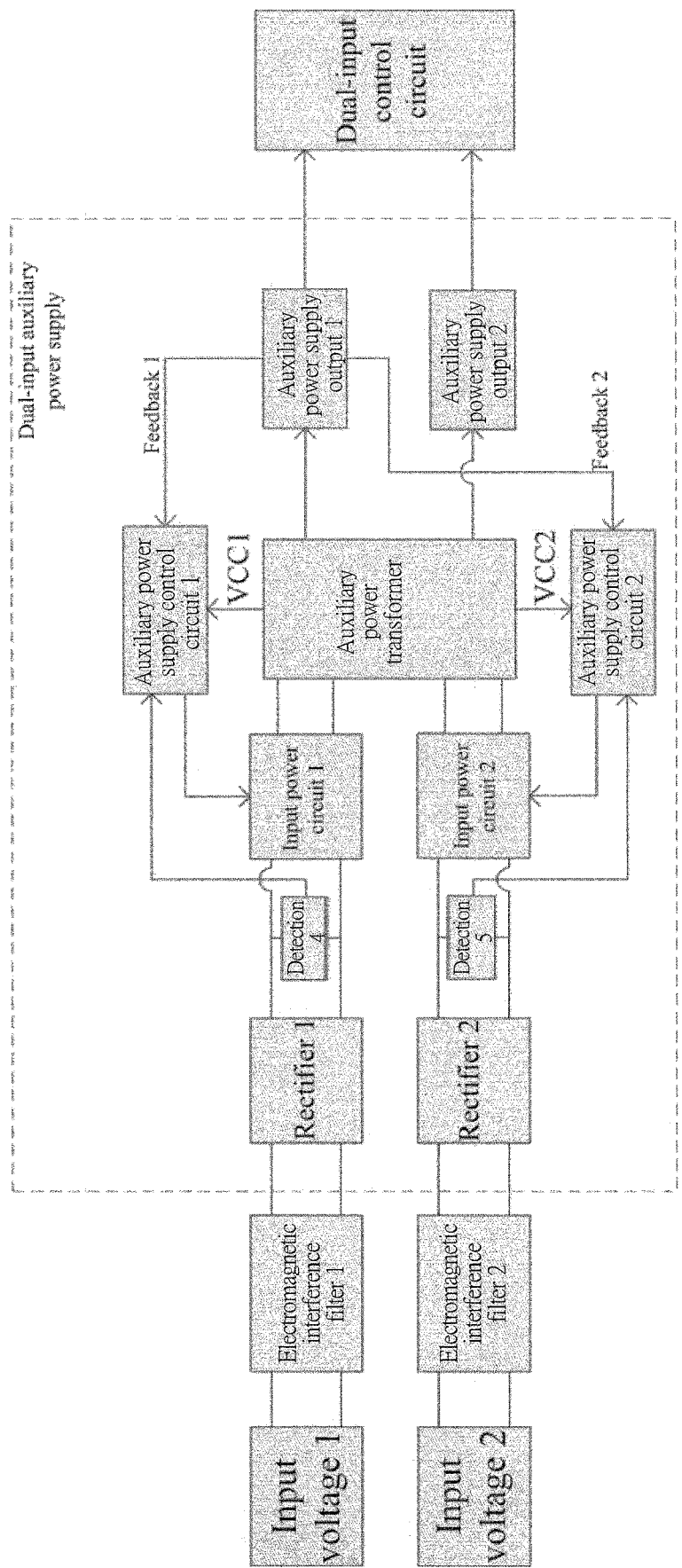
FIG. 5 is a schematic structural diagram of a dual-input flyback auxiliary power supply used according to an embodiment of the present invention.

When one or each of the input voltage 1 and the input voltage 2 has a normal input voltage, an auxiliary power supply should operate to supply power to the dual-input control circuit and the contactor to ensure that switching between the two inputs can be performed. Dual inputs are also used for the auxiliary power supply in this embodiment. Preferably, a flyback topology is used for the auxiliary power supply, and a flyback power supply can meet requirements of multiple auxiliary power supply outputs and multiple-channel isolation. If a conventional solution is used for two auxiliary power supplies for input, as shown in FIG. 4, two single-input auxiliary power supplies are required, that is, two flyback auxiliary power supply circuits are required, including two auxiliary power supply input power circuits, two auxiliary power transformers, two auxiliary power supply output power circuits, and two auxiliary power supply control circuits. FIG. 5 shows a single dual-input flyback auxiliary power supply used in this embodiment, including two auxiliary power supply input power circuits, one auxiliary power transformer, one auxiliary power supply output power circuit, and two auxiliary power supply control circuits, as shown in FIG. 5. The dual-input flyback auxiliary power supply has one less auxiliary power transformer and one less auxiliary power supply output power circuit than a conventional dual flyback auxiliary power supply. This can reduce both costs and a required space.

The description of the dual-input auxiliary power supply is expanded according to FIG. 5. When one or each of the input voltage 1 and the input voltage 2 has a normal voltage input, the dual-input auxiliary power supply can ensure that voltages of the auxiliary power supply output 1 and the auxiliary power supply output 2 supply power without interruption. When both the input voltage 1 and the input voltage 2 are undervoltage or without input voltage, the auxiliary power supply output 1 and the auxiliary power supply output 2 have no output voltage. When the input voltage 1 has a normal input voltage and the input voltage 2 is undervoltage or has no input voltage, the auxiliary power supply output 1 and the auxiliary power supply output 2 are powered by the input voltage 1. When the input voltage 1 is undervoltage or has no input voltage and the input voltage 2 has a normal input voltage, the auxiliary power supply output 1 and the auxiliary power supply output 2 are powered by the input voltage 2. When each of the input voltage 1 and the input voltage 2 has a normal input voltage, the auxiliary power supply output 1 and the auxiliary power supply output 2 are powered by the input voltage 1. If the input voltage 1 is powered off or undervoltage, the auxiliary power supply output 1 and the auxiliary power supply output 2 are automatically switched to being powered by the input voltage 2 without interruption.

Further, when one of the input voltage 1 and the input voltage 2 has a normal voltage, and the other one is undervoltage or has no input, in order to prevent a power transistor of an auxiliary power supply input power circuit 1 and a power transistor of an auxiliary power supply input power circuit 2 from being turned on at the same time and affecting working of a dual-input auxiliary power supply circuit, in the dual-input auxiliary power supply, the auxiliary power supply control circuit 1 includes an input voltage 1 undervoltage protection function, and a voltage on a capacitor of a back end of a rectifier circuit 1 is detected by a detection circuit 4 to determine whether the input voltage 1 is undervoltage. When the input voltage 1 is undervoltage, the auxiliary power supply control circuit 1 controls to turn off the power transistor of the auxiliary power supply input power circuit 1, to cause the auxiliary power supply input power circuit 1 not to output power to the auxiliary power transformer. Similarly, the auxiliary power supply control circuit 2 includes an input voltage 2 undervoltage protection function, and a voltage on a capacitor of a back end of a rectifier circuit 2 is detected by a detection circuit 5 to determine whether the input voltage 2 is undervoltage. When the input voltage 2 is undervoltage, the auxiliary power supply control circuit 1 controls to turn off the power transistor of the auxiliary power supply input power circuit 2, to cause the auxiliary power supply input power circuit 2 not to output power to the auxiliary power transformer.

Further, in the dual-input auxiliary power supply, the auxiliary power supply output 1 is a main output of the auxiliary power supply. The auxiliary power supply output 1 feeds back a voltage to the auxiliary power supply control circuit 1 through a feedback 1, to implement a closed loop from the auxiliary power supply output 1 to the auxiliary power supply control circuit 1. The auxiliary power supply output 1 feeds back a voltage to the auxiliary power supply control circuit 2 through a feedback 2, to implement a closed loop from the auxiliary power supply output 1 to the auxiliary power supply control circuit 2. When each of the input voltage 1 and the input voltage 2 is a normal input voltage, in order to prevent the power transistor of the auxiliary power supply input power circuit 1 and the power transistor of the auxiliary power supply input power circuit 2 from being turned on at the same time and affecting working of the dual-input auxiliary power supply circuit, a closed-loop voltage of the feedback 1 of the auxiliary power supply control circuit 1 is set to be higher than a closed-loop voltage of the feedback 2 of the auxiliary power supply control circuit 2. When each of the output voltage 1 and the input voltage 2 is a normal working voltage, each of the auxiliary power supply control circuit 1 and the auxiliary power supply control circuit 2 works. In this case, a voltage of the auxiliary power supply output 1 is the closed-loop voltage of the feedback 1. Because the closed-loop voltage of the feedback 2 is lower than the voltage of the auxiliary power supply output 1, the auxiliary power supply control circuit 2 turns off the power transistor of the auxiliary power supply input power circuit 2, to enable the auxiliary power supply input power circuit 2 not to output power to the auxiliary power transformer.

Figure 6:
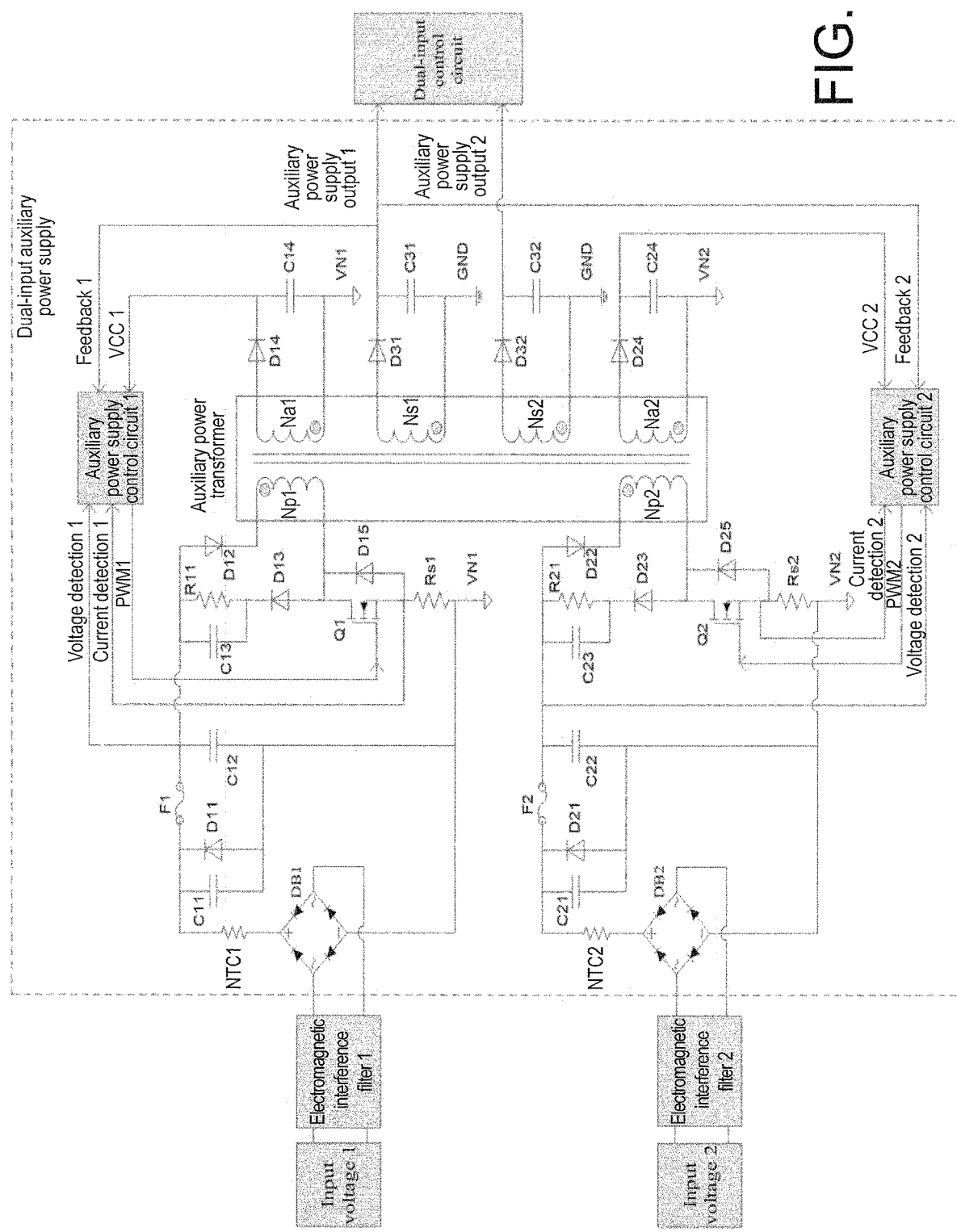
FIG. 6 is a further expanded schematic diagram of a dual-input auxiliary power supply according to an embodiment of the present invention.

FIG. 6 is a further expanded schematic diagram of a dual-input auxiliary power supply. An auxiliary power transformer is a flyback transformer. A rectifier bridge DB1, a negative temperature coefficient thermistor NTC1, an electrolytic capacitor C11, a diode D11, and a fuse F1 form a rectifier filter circuit 1. A capacitor C12, a capacitor C13, a resistor R11, a diode D13, a diode D12, a transformer winding Np1, a switch transistor Q1, and a resistor Rs1 form an input power circuit 1. A transformer winding Na1, a diode D14, and a capacitor C14 form an auxiliary power supply output loop, to output and supply a VCC1 voltage to the auxiliary power supply control circuit 1.

A rectifier bridge DB2, a negative temperature coefficient thermistor NTC2, an electrolytic capacitor C21, a diode D21, and a fuse F2 form a rectifier filter circuit 2. A capacitor C22, a capacitor C23, a resistor R21, a diode D23, a diode D22, a transformer winding Np2, a switch transistor Q2, and a resistor Rs2 form an input power circuit 1. A transformer winding Na2, a diode D24, and a capacitor C24 form an auxiliary power supply output loop, to output and supply a VCC2 voltage to the auxiliary power supply control circuit 2.

A transformer winding Ns1, a diode D31, and a capacitor C31 form an auxiliary power supply output circuit 1. A transformer winding Ns2, a diode D32, and a capacitor C32 form an auxiliary power supply output circuit 2.

When an input voltage 1 is an AC voltage, the AC voltage is rectified to a DC voltage by DB1. NTC1 is used for an input soft start. C11 filters a rectified DC bun wave voltage. D11 protects C11. Because C11 is a polarized electrolytic capacitor, when there is a negative voltage at both ends of C11, D11 can clamp the negative voltage to prevent C11 from being damaged by the negative voltage. F1 is used for input overcurrent protection.

When an input voltage 2 is an AC voltage, the AC voltage is rectified to a DC voltage by DB2. NTC2 is used for an input soft start. C21 filters a rectified DC bun wave voltage. D21 protects C21. Because C21 is a polarized electrolytic capacitor, when there is a negative voltage at both ends of C21, D21 can clamp the negative voltage to prevent C21 from being damaged by the negative voltage. F2 is used for input overcurrent protection.

The capacitor C13, the resistor R11, and the diode D13 form an RCD absorption circuit, to reduce a voltage spike of the switch transistor Q1.

The capacitor C23, the resistor R21, and the diode D23 form an RCD absorption circuit, to reduce a voltage spike of the switch transistor Q2.

The diode D12 is connected in series with the transformer winding Np1. When the input voltage 2 is a normal working voltage and the input voltage 1 is undervoltage or has no input, the control circuit 2 works, and the auxiliary power supply input power circuit 2 outputs power to the auxiliary power transformer. When the transformer winding Np1 is not connected in series with the diode D12, when the switch transistor Q2 is turned on, the transformer winding Np1, the capacitor C12, a body diode D15 of the switch transistor Q1, and the resistor Rs1 form an output loop, affecting normal working of a flyback power supply. When the transformer winding Np1 is connected in series with the diode D12, when the switch transistor Q2 is turned on, the loop formed by the transformer winding Np1, the capacitor C12, the body diode D15 of the switch transistor Q1, and the resistor Rs1 provides no output due to existence of the diode D12, thereby ensuring normal working of the flyback power supply.

The diode D22 is connected in series with the transformer winding Np2. When the input voltage 1 is a normal working voltage and the input voltage 2 is undervoltage or has no input, the control circuit 1 works, and the auxiliary power supply input power circuit 1 outputs power to the auxiliary power transformer. When the transformer winding Np2 is not connected in series with the diode D22, when the switch transistor Q1 is turned on, the transformer winding Np2, the capacitor C22, a body diode D25 of the switch transistor Q2, and the resistor Rs2 form an output loop, affecting normal working of a flyback power supply. When the transformer winding Np2 is connected in series with the diode D22, when the switch transistor Q1 is turned on, the loop formed by the transformer winding Np2, the capacitor C22, the body diode D25 of the switch transistor Q2, and the resistor Rs2 provides no output due to existence of the diode D22 exists, thereby ensuring normal working of the flyback power supply.

The auxiliary power supply output 1 feeds back a voltage to the auxiliary power supply control circuit 1 through a feedback 1, to implement a closed loop from the output 1 to the control circuit 1. Information about voltages at two ends of the capacitor C12 is transferred to the auxiliary power supply control circuit 1 through voltage detection 1. The auxiliary power supply control circuit 1 controls working of the switch transistor Q1 through PWM1.

The auxiliary power supply output 1 feeds back a voltage to the auxiliary power supply control circuit 2 through a feedback 2, to implement a closed loop from the output 1 to the control circuit 2. Information about voltages at two ends of the capacitor C22 is transferred to the auxiliary power supply control circuit 2 through voltage detection 2. The auxiliary power supply control circuit 2 controls working of the switch transistor Q2 through PWM2.

The auxiliary power supply output 1 and the auxiliary power supply output 2 provides a working power supply to a dual-input control circuit.

The dual-input control circuit used in this embodiment may perform control by using a microcontroller chip, and shares a microcontroller chip with a control circuit of an input part circuit of a key power supply unit. The used dual-input control circuit may alternatively perform control by using a single-chip microcomputer other than the microcontroller chip, or may perform control by using a circuit built by a simulation device. The control of the used dual-input control circuit by using the microcontroller chip is not limited to sharing a microcontroller chip with the control circuit of the input part circuit of the key power supply unit, and a separate microcontroller chip may be used.

The microcontroller included in the dual-input control circuit in this embodiment may further participate in auxiliary control of the dual-input auxiliary power supply. Depending on two input voltages of the dual-input auxiliary power supply, the microcontroller may participate in controlling whether the auxiliary power control circuit 1 and the auxiliary power control circuit 2 work.

The foregoing descriptions are only preferred implementations of the present invention, and the protection scope of the present invention is not limited to the foregoing implementations. However, all equivalent modifications or changes made by a person of ordinary skill in the art based on the disclosure of the present invention should be included within the protection scope described in the claims.

What is claimed is:

1. A dual-input circuit, wherein:
the dual-input circuit comprises a first input port, a second input port, an intelligent switching unit, an auxiliary power supply unit, and a key power supply unit;
the first input port receives a first input voltage, the second input port receives a second input voltage, and the auxiliary power supply unit is provided in parallel between the first input port and the second input port; and
the intelligent switching unit is connected to the first input port, the second input port, and the auxiliary power supply unit, to provide one of the first input voltage and the second input voltage to the key power supply unit,
the first input port comprises a first electromagnetic interference filter and a first detection circuit, the second input port comprises a second electromagnetic interference filter and a second detection circuit, and the intelligent switching unit comprises a contactor, a dual-input control circuit, a first contactor drive circuit, a second contactor drive circuit, a third electromagnetic interference filter, and a third detection circuit.

2. The dual-input circuit according to claim 1, wherein: the first electromagnetic interference filter and the second electromagnetic interference filter are respectively connected to the first input voltage and the second input voltage and respectively perform filtering.

3. The dual-input circuit according to claim 1, wherein: the first detection circuit detects whether the first input voltage works normally, and provides a first detection signal to the dual-input control circuit; the second detection circuit detects whether the second input voltage works normally, and provides a second detection signal to the dual-input control circuit; the third detection circuit detects whether the contactor outputs a voltage normally, and provides a third detection signal to the dual-input control circuit; and through determining based on the first detection signal, the second detection signal, and the third detection signal, the dual-input control circuit controls the contactor through the first contactor drive circuit and the second contactor drive circuit, to implement switching from one of the first input voltage and the second input voltage to the other or to remain in a current state.

4. The dual-input circuit according to claim 1, wherein: a first contacts (A2) and a second contact (C2) of the contactor are short-circuited, and a third contacts (B2) and a fourth contact (D2) of the contactor are short-circuited, to form an output of the contactor, and the output of the contactor is connected to the key power circuit through the third electromagnetic interference filter.

5. The dual-input circuit according to claim 1, wherein: the auxiliary power supply unit adopts a flyback dual-input auxiliary power supply, and is respectively connected to the first input voltage and the second input voltage through the first electromagnetic interference filter and the second electromagnetic interference filter; when one or two of the first input voltage and the second input voltage have a normal input voltage, the dual-input auxiliary power supply provides auxiliary power to the dual-input control circuit, the first contactor drive circuit, the second contactor drive circuit, the first detection circuit, the second detection circuit, and the third detection circuit; and when one of the first input voltage and the second input voltage is connected to the key power circuit, a main auxiliary power supply in the key power circuit provides auxiliary power to the dual-input control circuit, the first detection circuit, the second detection circuit, and the third detection circuit, while the first contactor drive circuit and the second contactor drive circuit are still powered by the dual-input auxiliary power supply.

6. The dual-input circuit according to claim 1, wherein: one of two inputs of the dual-input circuit is set as a main input and the other is set as a backup input by default.

7. The dual-input circuit according to claim 1, wherein: when only the first input voltage has a normal voltage and the second input voltage has no normal voltage, the first input voltage is connected to an output of the contactor, and the second input voltage is isolated from the output of the contactor and the first input voltage due to disconnection of a group of contacts corresponding to the second input voltage; or when only the second input voltage has a normal voltage and the first input voltage has no normal voltage, the second input voltage is connected to the output of the contactor, and the first input voltage is isolated from the output of the contactor and the second input voltage due to disconnection of a group of contacts corresponding to the first input voltage; or when both the first input voltage and the second input voltage have normal voltages, a main input thereof is connected to the output of the contactor, and a backup input thereof is isolated from a circuit of the output of the contactor and a voltage of the main input due to disconnection of a group of contacts corresponding to the backup input; when the voltage of the main input deteriorates, the dual-input control circuit sends a control signal to drive the contactor to switch, to connect the backup input to the output of the contactor; and only one of the first input voltage and the second input voltage is connected to the key power circuit at any moment.

8. The dual-input circuit according to claim 1, wherein: the contactor switches an alternating current (AC) loop and is capable of switching a high-voltage direct current (DC) loop; and specifically, the contactor is capable of switching with load on the AC loop and is capable of switching with load on the high-voltage DC loop.

* * * * *